(12) United States Patent
Wieker et al.

(10) Patent No.: US 12,450,614 B2
(45) Date of Patent: Oct. 21, 2025

(54) VIRTUAL CARD NUMBER AS A LOGIN CREDENTIAL

(71) Applicant: Capital One Services, LLC, McLean, VA (US)

(72) Inventors: Jeffrey Carlyle Wieker, Falls Church, VA (US); Kevan Emmott, Arlington, VA (US); Clayton Johnson, Edgewood, MD (US)

(73) Assignee: Capital One Services, LLC, McLean, VA (US)

( * ) Notice: Subject to any disclaimer, the term of this patent is extended or adjusted under 35 U.S.C. 154(b) by 228 days.

(21) Appl. No.: 17/840,752

(22) Filed: Jun. 15, 2022

(65) Prior Publication Data

US 2023/0410120 A1  Dec. 21, 2023

(51) Int. Cl.
*G06Q 20/40* (2012.01)
*G06Q 20/34* (2012.01)

(52) U.S. Cl.
CPC ....... *G06Q 20/4097* (2013.01); *G06Q 20/351* (2013.01); *G06Q 20/4016* (2013.01); *G06Q 20/407* (2013.01)

(58) Field of Classification Search
CPC ............. G06Q 20/4097; G06Q 20/351; G06Q 20/4016; G06Q 20/407
USPC .......................................................... 705/64
See application file for complete search history.

(56) References Cited

U.S. PATENT DOCUMENTS

| | | | | |
|---|---|---|---|---|
| 9,769,122 B2 * | 9/2017 | Winner | ............... | H04L 63/0815 |
| 11,568,408 B1 * | 1/2023 | Ashley | ............... | G06Q 20/4018 |
| 2014/0365377 A1 | 12/2014 | Salama et al. | | |
| 2015/0012434 A1 | 1/2015 | Aabye et al. | | |
| 2015/0046340 A1 | 2/2015 | Dimmick | | |
| 2016/0342992 A1 | 11/2016 | Lee | | |
| 2017/0154324 A1 * | 6/2017 | Singh | ................... | G06Q 20/349 |
| 2018/0357621 A1 | 12/2018 | Gjondrekaj et al. | | |
| 2018/0375863 A1 * | 12/2018 | Fan | ......................... | G06F 21/31 |
| 2019/0034914 A1 | 1/2019 | Kumawat et al. | | |
| 2019/0050849 A1 | 2/2019 | Yoo | | |

(Continued)

FOREIGN PATENT DOCUMENTS

| | | |
|---|---|---|
| EP | 3910582 A1 | 11/2021 |
| SG | 10202101039 T | 3/2021 |

*Primary Examiner* — Courtney P Jones
(74) *Attorney, Agent, or Firm* — Bookoff McAndrews, PLLC (57) ABSTRACT

Disclosed embodiments pertain to systems and methods related to user authentication with a virtual payment card. A virtual card number can be requested as a login credential for a user. A virtual card number can be transmitted through a credit card payment network to a financial institution that issued the virtual card for payment authorization. The user can subsequently be authenticated in response to a granted payment authorization by the financial institution. The financial institution can execute a machine learning model trained to infer fraud based on a usage pattern associated with a virtual card number. Granting or denying payment authorization can depend on a confidence score returned by the model regarding the likelihood of fraud. A virtual card number associated with authentication can include one or more distinguishing characteristics in one instance. Further, virtual card numbers can include use restrictions in time and location.

20 Claims, 5 Drawing Sheets

(56) References Cited

U.S. PATENT DOCUMENTS

| | | |
|---|---|---|
| 2019/0197523 A1* | 6/2019 | Li .......................... G06Q 20/38 |
| 2019/0306158 A1* | 10/2019 | Jain ...................... H04L 63/108 |
| 2020/0051065 A1 | 2/2020 | Yoo |
| 2020/0051085 A1 | 2/2020 | Shinde et al. |
| 2020/0167793 A1* | 5/2020 | Muralidharan .... G06Q 20/4018 |
| 2020/0342445 A1 | 10/2020 | Yoo |
| 2020/0364712 A1 | 11/2020 | Jamison et al. |
| 2020/0410476 A1 | 12/2020 | Yoo |
| 2021/0065163 A1 | 3/2021 | Yoo |
| 2021/0174352 A1* | 6/2021 | Kenney ............. G06Q 20/3224 |
| 2021/0192518 A1 | 6/2021 | Rule et al. |
| 2021/0201210 A1 | 7/2021 | Navin et al. |
| 2021/0201319 A1* | 7/2021 | Vinayagam .......... G06Q 20/354 |
| 2022/0058684 A1* | 2/2022 | Balsavias ........... G06Q 30/0208 |
| 2023/0140792 A1* | 5/2023 | Jain ....................... G06Q 20/34<br>705/44 |
| 2023/0214843 A1* | 7/2023 | Abay ................. G06Q 20/4016<br>705/44 |

\* cited by examiner

VIRTUAL CARD NUMBER AS A LOGIN CREDENTIAL

BACKGROUND

In computer technology, authentication refers to the process by which a user's identity is electronically validated to gain access to a computer system. In other words, an authentication system verifies identity rather than merely determining identity. Traditionally, a username and password were often used to authenticate—and are still used in lesser secure environments. However, these simple authentication systems are not appropriately secure in some environments.

Today, multi-factor authentication (MFA) mechanisms are often used as an electronic means to grant access to a computer system, website, etc. In MFA systems, a user presents two or more factors or evidence to effect successful authentication. These factors encompass various types of information categorized as knowledge, possession, and inherence. "Knowledge" refers to something the user knows, whereas "possession" refers to something the user has. Finally, "inherence" refers to something the user is. Using these combinations of factors enables verifications of one's identity to be more robust and secure.

Two-factor authentication (2FA), which is a subset of MFA, is becoming more commonplace today. Most often, in 2FA, a third-party authenticator (TPA) application (app) is used to implement the authentication challenges and responses. Conventional 2FA systems commonly employ a username/password and a one-time pin (OTP) to authenticate a user. However, these 2FA systems can easily be compromised if an imposter is able to retrieve or intercept the OTP.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

According to one aspect, disclosed embodiments can include a user authentication system that comprises a processor coupled to a memory that includes instructions that, when executed by the processor, cause the processor to request a virtual card number as a login credential for a user associated with access to a third-party website, transmit the virtual card number with a zero charge amount through a credit card payment network to a financial institution that issued the virtual card number for payment authorization in which the virtual card number is provided by a browser extension in response to the request, and authenticate the user in response to approved payment authorization by the financial institution or return an authentication error in response to a declined payment authorization. Further, the request for a virtual card number can be initiated in response to selecting an option on a login page to use the virtual card number. In one instance, the browser extension requests the user log into a financial institution account prior to providing the virtual card number in response to the request. The virtual card number can also be customized for one-time use or for a merchant website. Additionally, the virtual card number can include different card verification values for different usage customizations. The instructions can further cause the processor to request the virtual card number login credential as a second-factor authentication after successful first-factor authentication. In one instance, a usage pattern is analyzed to detect fraud as part of the payment authorization, wherein payment authorization is denied when fraud is detected. Further, a machine learning model can be trained and executed to infer the fraud based on the usage pattern.

In accordance with another aspect, disclosed embodiments can include a method comprising executing, on a processor, instructions that cause the processor to perform operations associated with user authentication. The operations include requesting a virtual card number login credential for a user seeking access to a computing resource, sending the virtual card number with a zero charge amount through a credit card payment network to a financial institution that issued the virtual card number for payment authorization, in which wherein the virtual number is supplied automatically by a program associated with the financial institution that executes on a computing device of the user in response to the request, and authenticating the user in response to approved payment authorization by the financial institution or returning an authentication error in response to a declined payment authorization. The operations further include sending the virtual card number automatically supplied by a web browser extension program through the credit card payment network. Further operations include initiating the request for the virtual card number in response to selecting an option for virtual card number authentication on a website or mobile application. The operations can further comprise sending a virtual card number restricted to one-time use or sending a virtual card number restricted for use by a website or mobile application the user seeks to access. Furthermore, the operations further comprise requesting the virtual card number login credential as a second-factor authentication after successful first-factor authentication. The operations also comprise comparing user identity information provided with the approved payment authorization with information from the user and returning an authentication failure when the user identity information differs.

According to yet another aspect, disclosed embodiments can include a computer-implemented method. The method can comprise receiving a virtual card number associated with a payment authorization request, identifying the virtual card number as being associated with authentication based on at least one characteristic of the virtual card number, executing a machine learning model trained to infer fraud based on a usage pattern associated with the virtual card number and output a confidence score that indicates a likelihood of fraud associated with the virtual card number, and granting the payment authorization request when the confidence score satisfies a predetermined threshold and otherwise denying the payment authorization request. The computer-implemented method further comprises bypassing checking available funds of an account associated with the virtual card number. Further, the method comprises determining one or more restrictions associated with the virtual card number, evaluating the one or more restrictions with respect to the payment authorization request, and denying the payment authorization request when one of the one or more restrictions is violated. The computer-implemented method further comprises returning information associated with an identity of a user in conjunction with granting the payment authorization request.

To the accomplishment of the foregoing and related ends, certain illustrative aspects of the claimed subject matter are described herein in connection with the following description and the annexed drawings. These aspects indicate various ways in which the subject matter can be practiced, all of which are intended to be within the scope of the disclosed subject matter. Other advantages and novel features may become apparent from the following detailed description when considered in conjunction with the drawings.

DETAILED DESCRIPTION

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Disclosed embodiments herein generally pertain to authentication systems and, more particularly, to enhancing multi-factor authentication (MFA) systems and single-factor authentication (SFA) systems. In some aspects, details disclosed relate to user authentication using a virtual card or virtual card number (VCN). A VCN can comprise a multi-digit virtual credit card number, among other things (e.g., security code, expiration date), that can exist in a virtual rather than physical form. The virtual card or VCN can allow a primary cardholder (e.g., a user or a customer) to shop or otherwise purchase products or services online without providing a primary account number (PAN) (e.g., a primary credit card number) associated with a primary credit card account. As such, because a VCN is not a physical card, its usage can be mostly online and/or in a verbal context (e.g., over the phone). The VCN can be linked to a primary credit card account in order to utilize the credit card network or payment rail, which can provide more protection against fraudulent activity than a debit card transaction. The embodiments herein can utilize VCNs for login validation without verifying the available balance on the primary credit card account associated with the VCN. For login validation, the VCN can be customized for a zero-dollar ($0) authorization charge, so a higher amount cannot be charged. In other words, the VCN can be employed to charge a zero dollar ($0) to utilize the credit card network in an SFA system or an MFA system. The VCN can also be used to make payments by leveraging the uniqueness of the VCN without exposing a financial risk because the PAN can remain undisclosed.

In some aspects, an application or a browser extension via an application programming interface (API) can be used as an interface for the automatic generation of a new VCN or retrieval of a previously used VCN (e.g., generally, VCN). The option to use a VCN as a login validation or payment option can be displayed on the login page or payment page, respectively, of a mobile application, a mobile web browser, or a desktop web browser. Upon selecting the option to use a VCN, the VCN can be automatically generated or retrieved. The primary cardholder can also create a VCN in the primary card holder's primary credit card account for use or later retrieval. It is contemplated that biometric data can be used in combination with a VCN in an MFA system. The VCN can be customized for one-time use, for multiple uses, for a specific merchant or non-merchant website or mobile application, for any merchant or non-merchant website or mobile application, for a specific type of product, for a capped spending amount, or for a specified duration of time.

The credit card payment network can have an authorization process and an authentication process which can provide a higher proof of trust for identity verification. In addition, the primary card holder's identity has been verified upon creating the primary credit card account associated with the VCN. Thus, using a VCN for authentication can provide multiple layers of security. A VCN can be used as an SFA (e.g., as a primary passcode) or as an MFA. For example, a VCN can be used as two-factor authentication (2FA) in place of other 2FA systems, such as a one-time pin (OTP).

It is contemplated that a card verification value (CVV) can be used for customization purposes instead of creating a new VCN. For example, in some instances, the same VCN can be used for multiple purposes by employing a different CVV for different purposes. For example, one CVV can be used with a VCN for logging in, and the same VCN can be used with a different CVV for making purchases. As another example, one CVV can be used with a VCN for payment with one merchant, and the same VCN can be used with a different CVV for payment with another merchant. However, as a login, it is contemplated that only the VCN needs to be entered. Whereas, as a payment, the VCN information can also require entry of a CVV, expiration date, and billing address. Upon entering or submitting the VCN information, the VCN can be processed through an authorization process and an authentication process, as would a credit card transaction.

During the authorization process, the merchant can obtain approval for payment from the issuing bank, e.g., the bank that issued the primary credit card account (e.g., the PAN) associated with the VCN. The payment amount can be a zero dollar ($0) charge if the transaction is for a login validation. The authorization process can begin with submitting the VCN information to the merchant upon logging in or making a payment. The merchant can send the primary card holder's VCN information to the acquiring bank (or its acquiring processor) via a network (e.g., communication network, Internet connection, or phone line). The acquiring bank or its acquiring processor can forward the VCN information to the credit card network. The credit card network can authorize the transaction and request payment authorization from the issuing bank. The payment authorization request can include the VCN, expiration date, and CVV (e.g., generally, VCN information), as well as the billing address and payment amount.

The authentication process can comprise the issuing bank verifying the primary card holder's VCN information using fraud protection or fraud rules. The issuing bank can validate the VCN, verify the expiration date, match the billing address to the one on file, and validate the CVV number along with checking the available credit if a payment was made. However, it is contemplated that verification of the available balance is not necessary for login validation because the authorized charge for login validation is zero dollar ($0). For logging in, if only the VCN is required and entered, the expiration date on file can still be verified to make sure that VCN has not expired. In addition, other data such as the location, time, and device can be detected and analyzed for fraud detection. Upon detecting unusual patterns, the primary cardholder can be alerted and asked to verify whether the primary cardholder initiated the login or payment in question. The issuing bank can approve or decline the payment authorization request and send a response to the merchant back through the credit card payment network and to the acquiring bank or its acquiring processor. If the transaction is for a login validation, the approval or denial of the zero dollar ($0) charge can indicate whether the primary card holder's identity is authenticated. If the transaction is for a payment, the issuing bank can place a hold for the payment amount on the primary card holder's account so that the merchant can collect the approved payment amount and the merchant can provide the primary cardholder with a receipt to complete the sale.

In addition, if the transaction is for a payment, the payment can also have a settlement process. The settlement process can take 24 to 48 hours for payment to transfer. During the settlement process, payment information can be posted to the primary card holder's statement and the merchant's statement.

Figure 1:
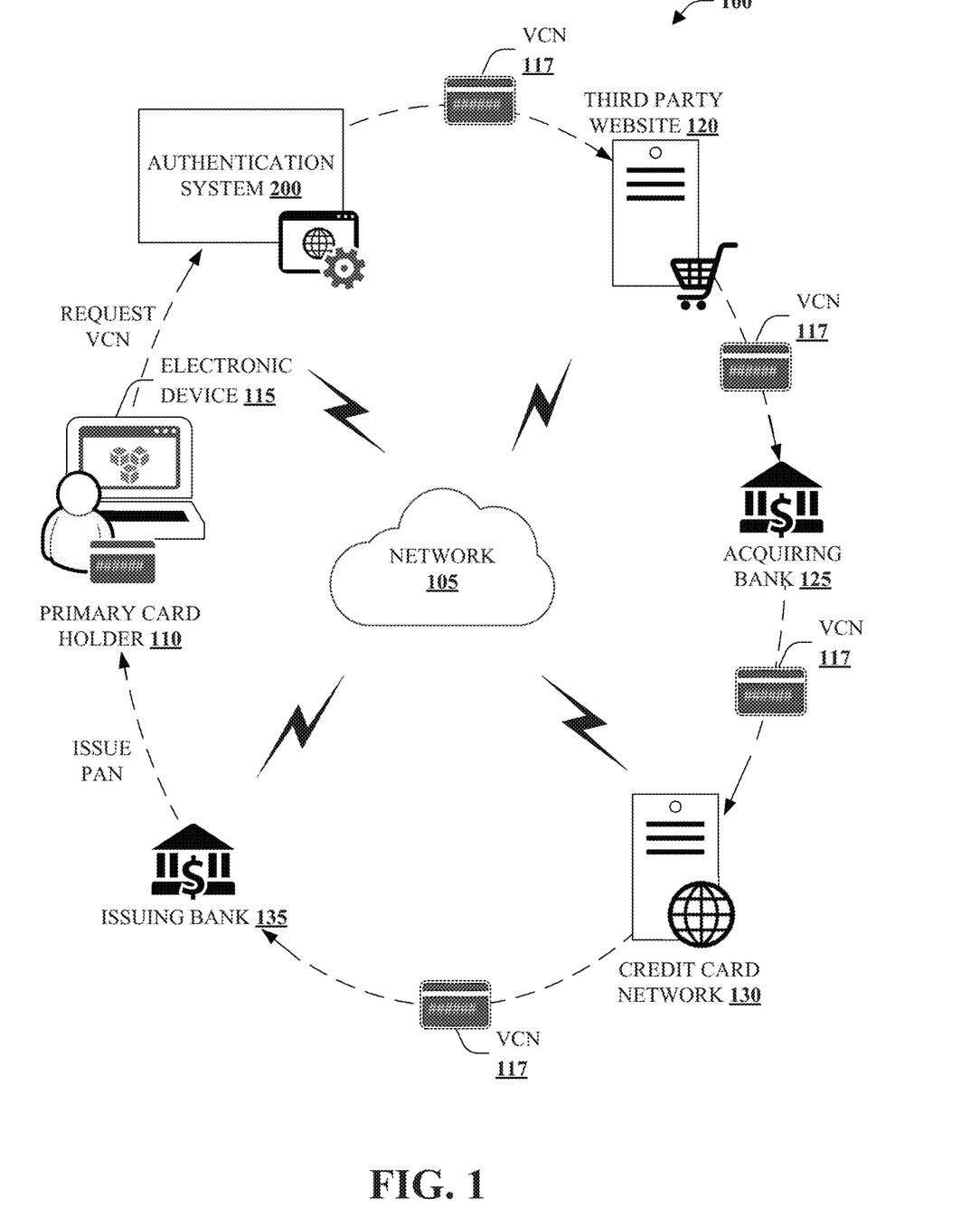
FIG. 1 illustrates an overview of an example implementation in accordance with one or more embodiments described herein.

Referring to FIG. 1 to illustrate an overview of an example implementation 100 in accordance with one or more embodiments described herein. The example implementation 100 can comprise network 105, primary cardholder 110, electronic device 115, VCN 117, third-party website 120, acquiring bank 125, credit card network 130, issuing bank 135, and authentication system 200. The primary cardholder 110 can use the electronic device 115 such as, for example, a computer, laptop, tablet, or mobile phone to log into or make a payment on the third-party website 120 (e.g., a merchant or non-merchant website or mobile application unassociated with the primary cardholder 110 or issuing bank 135). A login page can display an option to use a VCN as a login validation on the third-party website 120. Upon selecting to use a VCN to log in, the authentication system 200, via an application or a browser extension with an API installed on the electronic device 115, can interface with the electronic device 115 to automatically generate VCN 117 (e.g., a new VCN or retrieval of a previously used VCN) and automatically fill in the VCN 117 information on third-party website 120's login page. The authentication system 200, via an application or browser extension, can also generate or retrieve the VCN 117 on a payment page and automatically fill in the VCN 117 information on a third-party website 120's payment page for making payments.

The VCN 117 can be used in an SFA system or an MFA system. In an MFA system, the VCN 117 can also be used in combination with biometric data as an additional factor. The VCN 117 can have multiple CVVs for different purposes. For example, the VCN 117 can have one CVV number for logging into third-party website 120 and another CVV number for making payments on third-party website 120.

The third-party website 120 can send the VCN 117 to acquiring bank 125 or its acquiring processor via the network 105. The acquiring bank 125 or its acquiring processor can forward the VCN 117 to the credit card network 130. The credit card network 130 can authorize the transaction and request payment authorization from the issuing bank 135. The payment authorization request can include the VCN 117 information along with the payment amount.

The issuing bank 135, via the authentication system 200, can verify the VCN 117 information and payment amount. The authentication system 200 can also perform fraud detection by monitoring and analyzing data such as the location, time, and device used for the login or payment transaction. If fraud is detected, the authentication system 200 can send the primary cardholder 110 an alert requesting verification of whether the transaction (e.g., zero dollar ($0) login authorization or payment) was made by the primary cardholder 110. The issuing bank 135, via the authentication system 200, can approve or decline the payment authorization request and send a response to the third-party website 120 through the credit card payment network.

Whether the VCN 117 is used as a login passcode (e.g., a primary passcode, an SFA, or an MFA) or used to make payments, the VCN can be processed through an authorization process and an authentication process as would a credit card transaction. The identity of the primary cardholder 110 can be verified to create a primary credit card account, the identity of the primary cardholder 110 can be verified again every time a VCN associated with the primary credit card account is used, and by using a VCN, the primary credit card account (e.g., PAN) can be kept safe. Thus, using a VCN as a login passcode can provide layers of credit card security level protection that other authentication systems do not have.

The authorization process can comprise submission of the VCN information to the third-party website 120 for logging in or making a payment. As a login validation, the authorized charge amount can be zero dollar ($0). As a payment method, the authorized charge amount can be the payment amount. The VCN information can be sent to acquiring bank 125 or its acquiring processor via network 105. The acquiring bank 125 or its acquiring processor can forward the VCN information to credit card network 130, which in turn can authorize the transaction and request payment authorization from issuing bank 135. The payment authorization request can include the VCN, expiration date, billing address, CVV, and payment amount as a payment method. As a login, it is contemplated that besides the VCN, other information may not be required, although it would provide additional security. For example, the primary cardholder 110 can enter VCN 117 to log into third-party website 120 without entering the primary cardholder 110's billing address. However, the location, time, and device used can be tracked to detect fraud.

The authentication process can comprise the issuing bank 135 verifying, via the authentication system, the VCN 117 using fraud protection. The issuing bank 135, via the authentication system, can validate the VCN 117, verify the available balance, match the billing address to the one on file, and validate the CVV number. In addition, the location, time, and device used for the transaction (e.g., the login or the purchase) can also be monitored and assessed for fraud detection. However, for login validation, information such as available balance of the primary credit card account does not need to be verified and especially if the authorized payment amount is zero dollar ($0). The issuing bank 135, via the authentication system 200, can approve or decline the payment authorization request and send the response to the merchant back through the credit card payment network and to the acquiring bank 125 or its acquiring processor. The approval or denial of the zero dollar ($0) charge can indicate whether the primary cardholder 110's login is validated. If a payment amount is approved, the issuing bank 135 can place a hold for the payment amount on the primary cardholder 110's account so that the merchant owner of the third-party website 120 can collect the approved payment amount and the merchant owner of the third-party website 120 can provide the primary cardholder 110 a receipt to complete the sale.

Figure 2:
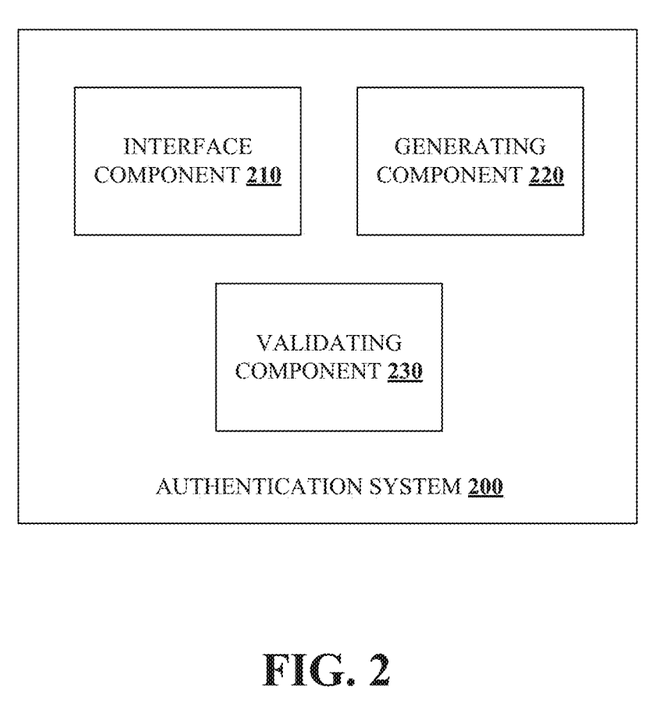
FIG. 2 illustrates a block diagram of an example, non-limiting login validation system in accordance with one or more embodiments described herein.

FIG. 2 illustrates a block diagram of an example, non-limiting authentication system 200, in accordance with one or more embodiments described herein. The authentication system 200 can comprise interface component 210, generating component 220, and validating component 230. The interface component 210 (e.g., via an application or a browser extension with an API) can receive a request to issue the VCN 117 to the primary cardholder 110 of a primary credit card account to use as a login credential or a payment method on the third-party website 120. The request can be made by selecting on the login page to use the VCN 117 as a login credential or by selecting on the payment page to use the VCN 117 as a payment method. Upon receiving the request by the interface component 210, the generating component 220 can automatically generate a new VCN or retrieve a previously used VCN, e.g., VCN 117. The interface component 210 (e.g., via an application or a browser extension with an API) can automatically fill in the information for VCN 117 on the login page or the payment page. If there is more than one CVV associated with the VCN 117 for different customized purposes, the generating component 220 can generate or retrieve the appropriate CVV for the interface component 210 to fill in the login page or the payment page on the third-party website 120. However, a separate VCN can also be used for different purposes.

The validating component 230 can validate or authenticate the primary cardholder 110's login or payment by approving or denying an authorized payment submitted to the third-party website 120 and passed through the credit card network 130, based on a confidence score of a machine learning model. Data of authorized payments can be mapped and modeled to analyze any given authorized payments for fraud detection based on a predetermined confidence score. For example, the location, time, and device used to make authorized payments can be collected and mapped or modeled. If an authorized payment has a confidence score below a predetermined threshold because the authorized payment seems out of the ordinary, the interface component 210 can alert the primary cardholder 110. In addition, the validating component 230 can also decline the authorized payment.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers, . . . ). Such components, among others, can automate certain mechanisms or processes performed, thereby making portions of the systems and methods more adaptive as well as efficient and intelligent. By way of example, and not limitation, the authentication system 200 can employ such mechanisms at least to assess the risk associated with approving an authorized payment. For example, a machine learning model can be trained and employed to automatically assess the risk of approving an authorized payment by an unauthorized holder of the VCN 117 (e.g., someone other than the primary cardholder 110) on a myriad of factors.

Figure 3:
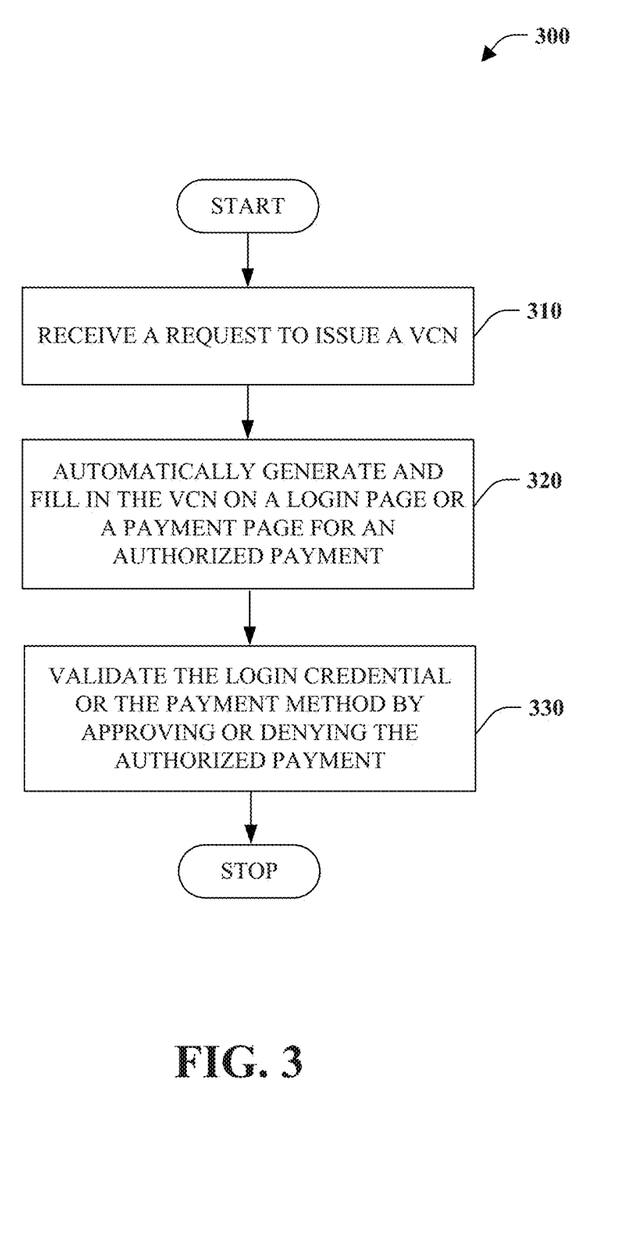
FIG. 3 illustrates a flow diagram of an example, non-limiting computer-implemented method in accordance with one or more embodiments described herein.
Figure 4:
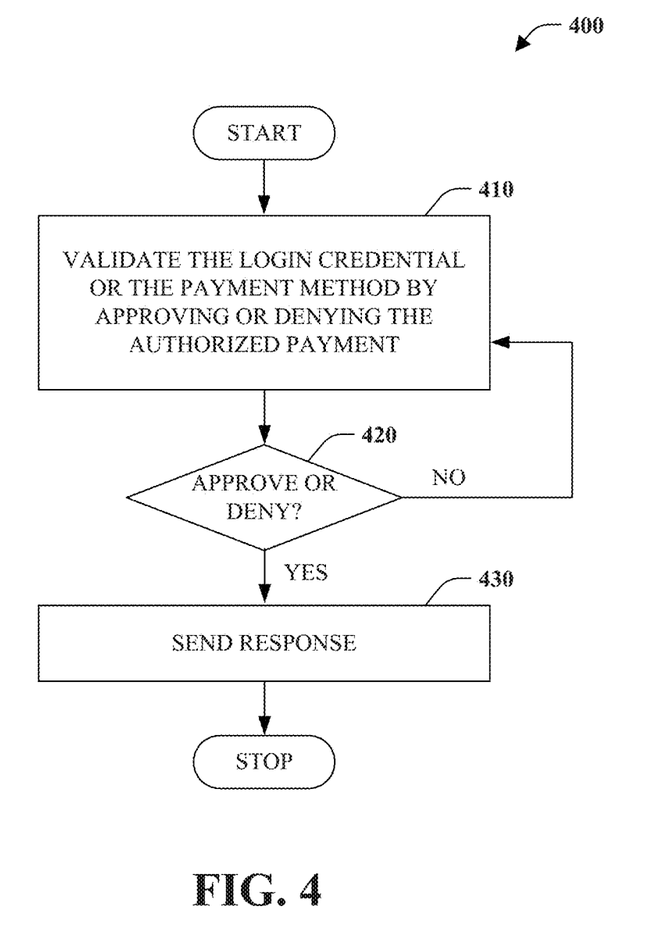
FIG. 4 illustrates another flow diagram of an example, non-limiting computer-implemented method in accordance with one or more embodiments described herein.

FIGS. 3 and 4 depict example, non-limiting computer-implemented methods 300 and 400 in accordance with the example systems described above. While, for purposes of simplicity of explanation, the methodologies shown herein, e.g., in the form of flow diagrams, are shown and described as a series of acts, it is to be understood and appreciated that disclosed subject matter is not limited by the order of acts, as some acts can occur in a different order and/or concurrently with other acts from that shown and described herein. For example, those skilled in the art will understand and appreciate that a methodology could alternatively be represented as a series of interrelated states or events, such as in a state diagram. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 3 illustrates a flow diagram of an example, non-limiting computer-implemented method 300 in accordance with one or more embodiments described herein. At 310, the computer-implemented method 300 can comprise receiving (e.g., via the interface component 210), by the authentication system 200 operatively coupled to a processor (e.g., processor(s) 510), a request to issue the VCN to the primary cardholder 110 of a primary credit card account to use as a login credential or a payment method on a third-party website. At 320, the computer-implemented method 300 can comprise automatically generating (e.g., via the generating component 220) and filling in (e.g., via the interface component), by the authentication system 200, the VCN on a login page or a payment page for an authorized payment through a credit card payment network. At 330, the computer-implemented method 300 can comprise validating (e.g., via the validating component 230), by the authentication system 200, the login credential or the payment method by approving or denying the authorized payment, submitted by the primary cardholder to the third-party website, based on a confidence score of a machine learning model of usage patterns.

FIG. 4 illustrates another flow diagram of an example, non-limiting computer-implemented method 400 in accordance with one or more embodiments described herein. At 410, the computer-implemented method 400 can comprise validating (e.g., via the validating component 230), by the authentication system 200, the login credential or the payment method by approving or denying the authorized payment, submitted by the primary cardholder to the third-party website, based on a confidence score of a machine learning model of usage patterns. At 420, the computer-implemented method 400 can comprise determining (e.g., via the validating component 230), by the authentication system 200, whether to approve or deny the authorized payment (e.g., the authorization request) by verifying the information of the VCN 117 and analyzing factors relating to usage patterns such as location, time, and device used for the authorized payment. For example, the machine learning model can comprise a decision tree with questions to detect fraud upon which a confidence score is provided. Example questions can include whether the location is familiar or makes sense (e.g., not being at two locations simultaneously), whether the time is out of the ordinary, and whether the device used is known. If yes, the authorized payment is approved, then at 430, the computer-implemented method 400 can comprise sending (e.g., via the interface component 210), by the authentication system 200, a response to the third-party website 120.

As used herein, the terms "component" and "system," as well as various forms thereof (e.g., components, systems, sub-systems . . . ) are intended to refer to a computer-related entity, either hardware, a combination of hardware and software, software, or software in execution. For example, a component can be but is not limited to being a process running on a processor, a processor, an object, an instance, an executable, a thread of execution, a program, and/or a computer. By way of illustration, both an application running on a computer and the computer can be a component. One or more components can reside within a process and/or thread of execution, and a component can be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference can be employed to identify a context or an action or can be used to generate a probability distribution over states, for example. An inference can be probabilistic. For example, computation of a probability distribution over states of interest can be based on a consideration of data or events. Inference can also refer to techniques employed for composing higher-level events from a set of events or data. Such inference can result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 5:
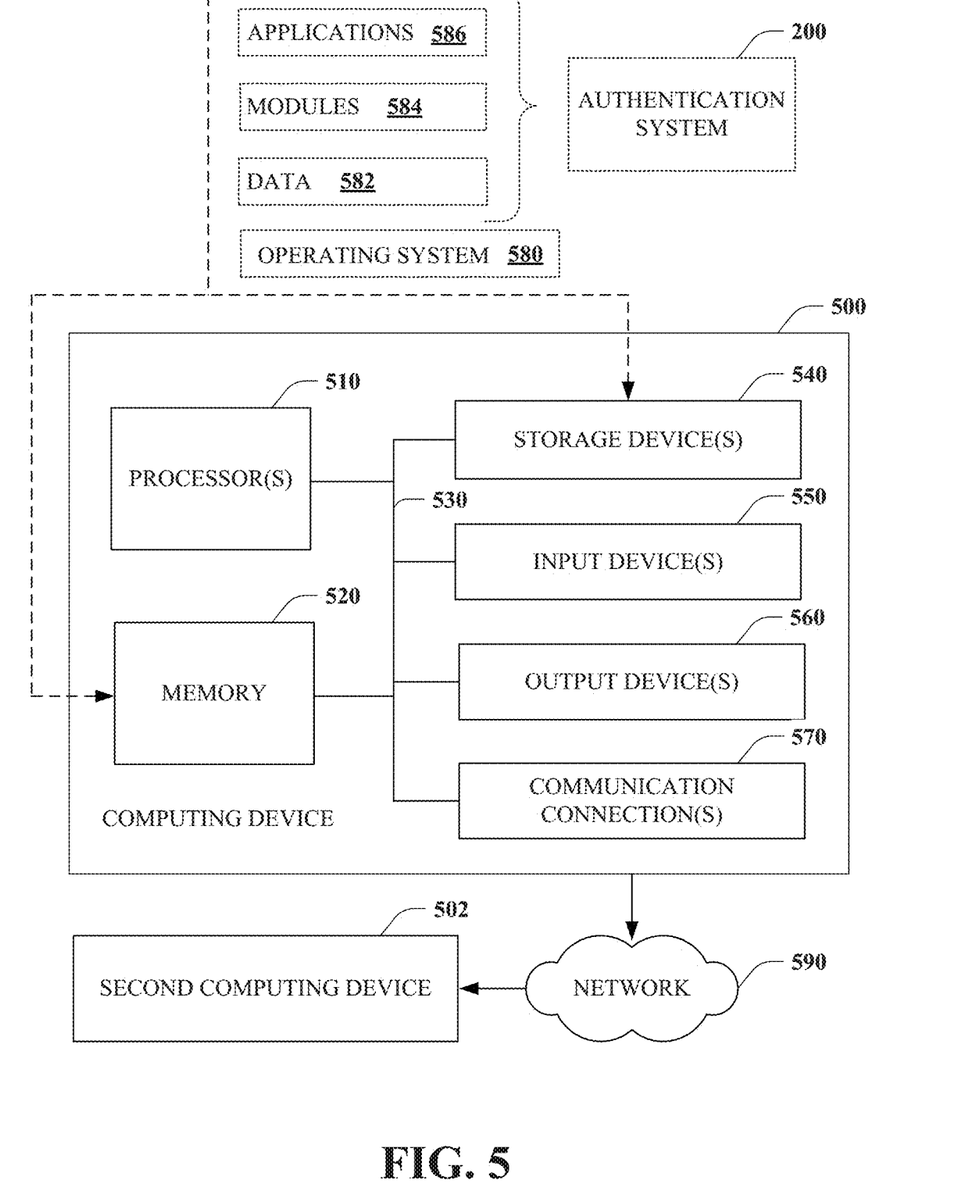
FIG. 5 is a block diagram illustrating a suitable operating environment for aspects of the subject disclosure.

To provide a context for the disclosed subject matter, FIG. 5, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules can be located in one or both of local and remote memory devices.

With reference to FIG. 5, illustrated is an example computing device 500 (e.g., desktop, laptop, tablet, watch, server, hand-held, programmable consumer or industrial electronics, set-top box, game system, compute node, . . . ). The computing device 500 includes one or more processor(s) 510, memory 520, system bus 530, storage device(s) 540, input device(s) 550, output device(s) 560, and communications connection(s) 570. The system bus 530 communicatively couples at least the above system constituents. However, the computing device 500, in its simplest form, can include one or more processors 510 coupled to memory 520, wherein the one or more processors 510 execute various computer-executable actions, instructions, and or components stored in the memory 520.

The processor(s) 510 can be implemented with a general-purpose processor, a digital signal processor (DSP), an application-specific integrated circuit (ASIC), a field-programmable gate array (FPGA) or other programmable logic, discrete gate or transistor logic, discrete hardware components, or any combination thereof designed to perform the functions described herein. A general-purpose processor can be a microprocessor, but in the alternative, the processor can be any processor, controller, microcontroller, or state machine. The processor(s) 510 can also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 510 can be a graphics processor unit (GPU) that performs calculations concerning digital image processing and computer graphics.

The computing device 500 can include or otherwise interact with a variety of computer-readable media to facilitate control of the computing device to implement one or more aspects of the disclosed subject matter. The computer-readable media can be any available media accessible to the computing device 500 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 500. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 520 and storage device(s) 540 are examples of computer-readable storage media. Depending on the configuration and type of computing device, the memory 520 can be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 500, such as during start-up, can be stored in non-volatile memory, while volatile memory can act as external cache memory to facilitate processing by the processor(s) 510, among other things.

The storage device(s) 540 include removable/non-removable, volatile/non-volatile storage media for storage of vast amounts of data relative to the memory 520. For example, storage device(s) 540 include, but are not limited to, one or more devices such as a magnetic or optical disk drive, floppy disk drive, flash memory, solid-state drive, or memory stick.

Memory 520 and storage device(s) 540 can include, or have stored therein, operating system 580, one or more applications 586, one or more program modules 584, and data 582. The operating system 580 acts to control and allocate resources of the computing device 500. Applications 586 include one or both of system and application software and can exploit management of resources by the operating system 580 through program modules 584 and data 582 stored in the memory 520 and/or storage device(s) 540 to perform one or more actions. Accordingly, applications 586 can turn a general-purpose computer 500 into a specialized machine in accordance with the logic provided thereby.

All or portions of the disclosed subject matter can be implemented using standard programming and/or engineering techniques to produce software, firmware, hardware, or any combination thereof to control the computing device 500 to realize the disclosed functionality. By way of example and not limitation, all or portions of the authentication system 200 can be, or form part of, the application 586, and include one or more modules 584 and data 582 stored in memory and/or storage device(s) 540 whose functionality can be realized when executed by one or more processor(s) 510.

In accordance with one particular embodiment, the processor(s) 510 can correspond to a system on a chip (SOC) or like architecture including, or in other words integrating, both hardware and software on a single integrated circuit substrate. Here, the processor(s) 510 can include one or more processors as well as memory at least similar to the processor(s) 510 and memory 520, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the authentication system 200 and/or functionality associated therewith can be embedded within hardware in a SOC architecture.

The input device(s) 550 and output device(s) 560 can be communicatively coupled to the computing device 500. By way of example, the input device(s) 550 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 560, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 550 and output device(s) 560 can be connected to the computing device 500 by way of wired connection (e.g., bus), wireless connection (e.g., Wi-Fi, Bluetooth, . . . ), or a combination thereof.

The computing device 500 can also include communication connection(s) 570 to enable communication with at least a second computing device 502 utilizing a network 590. The communication connection(s) 570 can include wired or wireless communication mechanisms to support network communication. The network 590 can correspond to a local area network (LAN) or a wide area network (WAN) such as the Internet. The second computing device 502 can be another processor-based device with which the computing device 500 can interact. In one instance, the computing device 500 can execute the authentication system 200 for a first function, and the second computing device 502 can execute the authentication system 200 for a second function in a distributed processing environment. Further, the second computing device can provide a network-accessible service that stores source code, and encryption keys, among other things that can be employed by the authentication system 200 executing on the computing device 500.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A user authentication system, comprising:
 a processor coupled to a memory that includes instructions that, when executed by the processor, cause the processor to:
  request a virtual card number as a login credential for a user to gain access to a third-party website, the virtual card number associated with an issued primary credit card from a financial institution;
  receive, from the user, the virtual card number as the login credential for access to the third-party website;
  transmit the virtual card number with a zero charge amount through a credit card payment network to the financial institution that issued the primary credit card and the virtual card number for payment authorization; and authenticate the user to gain access to the third-party website in response to approved payment authorization by the financial institution or return an authentication error in response to a declined payment authorization.

2. The system of claim 1, wherein the request for a virtual card number is initiated in response to selecting an option on a login page to use the virtual card number.

3. The system of claim 1, wherein the virtual card number is provided by a browser extension in response to the request.

4. The system of claim 3, wherein the browser extension requests the user login to a financial institution account prior to providing the virtual card number in response to the request for the virtual card number.

5. The system of claim 1, wherein the virtual card number is customized for one-time use or a merchant website.

6. The system of claim 1, wherein the virtual card number comprises different card verification values for different usage customizations.

7. The system of claim 1, wherein the instructions further cause the processor to request the virtual card number login credential as a second-factor authentication after successful first-factor authentication.

8. The system of claim 1, wherein a usage pattern is analyzed to detect fraud as part of the payment authorization, wherein payment authorization is denied when fraud is detected.

9. The system of claim 8, wherein a machine learning model is trained and executed to infer the fraud based on the usage pattern.

10. A method, comprising:
executing, on a processor, instructions that cause the processor to perform operations associated with user authentication, the operations comprising:
  requesting a virtual card number as a login credential for a user to gain access to a third-party website;
  receiving, from the user, the virtual card number the login credential for access to the third-party website, the virtual card number associated with an issued primary credit card from a financial institution;
  sending the virtual card number with a zero charge amount through a credit card payment network to the financial institution that issued the primary credit card and the virtual card number for payment authorization; and
  authenticating the user to gain access to the third-party website in response to an approved payment authorization by the financial institution or returning an authentication error in response to a declined payment authorization.

11. The method of claim 10, the operations further comprising initiating the request for the virtual card number in response to selecting an option for virtual card number authentication on a website or mobile application.

12. The method of claim 10, the operations further comprising sending the virtual card number automatically supplied by a web browser extension program through the credit card payment network.

13. The method of claim 10, the operations further comprising sending a virtual card number restricted to one-time use.

14. The method of claim 10, the operations further comprising sending a virtual card number restricted for use by a website or mobile application the user seeks to access.

15. The method of claim 10, the operations further comprising requesting the virtual card number login credential as a second-factor authentication after successful first-factor authentication.

16. The method of claim 10, the operations further comprising:
comparing user identity information provided with the approved payment authorization with information from the user; and
returning the authentication error when the user identity information differs.

17. A computer-implemented method, comprising:
receiving a virtual card number as a login credential for a user for access to a third-party website, the virtual card number associated with an issued primary credit card from a financial institution and a payment authorization request with zero charge amount to the financial institution that issued the primary credit card and the virtual card number;
identifying the virtual card number as being associated with authentication based on at least one characteristic of the virtual card number;
executing a machine learning model trained to infer fraud based on a usage pattern associated with the virtual card number and output a confidence score that indicates a likelihood of fraud associated with the virtual card number; and
granting the payment authorization request and authenticating the user to gain access to the third-party website when the confidence score satisfies a predetermined threshold and otherwise denying the payment authorization request.

18. The computer-implemented method of claim 17, further comprising checking available funds of an account associated with the virtual card number.

19. The computer-implemented method of claim 17, further comprising:
determining one or more restrictions associated with the virtual card number; evaluating the one or more restrictions with respect to the payment authorization request; and
declining the payment authorization request when one of the one or more restrictions is violated.

20. The computer-implemented method of claim 17, further comprising returning information associated with an identity of a user in conjunction with granting the payment authorization request.

* * * * *